(12) United States Patent
Gordon

(10) Patent No.: US 6,361,486 B1
(45) Date of Patent: Mar. 26, 2002

(54) COAXIAL-DRIVE CENTRIFUGE PROVIDING TILT CONTROL RELATIVE TO CENTRIFUGAL FORCE

(75) Inventor: Gary B. Gordon, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/590,934

(22) Filed: Jun. 8, 2000

Related U.S. Application Data

(63) Continuation-in-part of application No. 09/514,975, filed on Feb. 29, 2000.

(51) Int. Cl.$^7$ ............................. B04B 5/02; B04B 9/00
(52) U.S. Cl. ........................... 494/19; 494/84; 366/217
(58) Field of Search ......................... 494/1, 7–9, 10, 494/19, 31, 33, 84; 366/217; 422/72

(56) References Cited

U.S. PATENT DOCUMENTS

| | | | |
|---|---|---|---|
| 300,545 A | * | 6/1884 | Wiegand |
| 648,601 A | * | 5/1900 | Stridsberg |
| 689,572 A | * | 12/1901 | Berrigan |
| 749,104 A | * | 1/1904 | Schoenefeldt |
| 790,081 A | * | 5/1905 | Seger |
| 895,173 A | * | 8/1908 | Ecaubert |
| 1,011,929 A | * | 12/1911 | Ecaubert |
| 1,040,373 A | * | 10/1912 | Michelsen |
| 1,566,770 A | * | 12/1925 | Packer |
| 2,822,127 A | * | 2/1958 | Sinn |
| 2,961,703 A | * | 11/1960 | Pinotti |
| 3,199,775 A | * | 8/1965 | Drucker |
| 3,402,821 A | * | 9/1968 | Peck |
| 3,420,436 A | * | 1/1969 | Ito |
| 4,454,041 A | * | 6/1984 | Kelsey |
| 4,479,720 A | * | 10/1984 | Mochida et al. |
| 4,586,292 A | * | 5/1986 | Carroll et al. |
| 4,776,832 A |   | 10/1988 | Martin et al. |
| 4,814,282 A |   | 3/1989 | Holen et al. |
| 5,167,448 A | * | 12/1992 | Herold et al. |
| 5,352,037 A | * | 10/1994 | Jouvin |

FOREIGN PATENT DOCUMENTS

| | | | |
|---|---|---|---|
| DE | 2209850 | * | 10/1972 |
| JP | 43-23374 | * | 10/1968 |
| JP | 3-193127 | * | 8/1991 |
| SU | 1622017 | * | 1/1991 |

\* cited by examiner

Primary Examiner—Charles E. Cooley

(57) ABSTRACT

A centrifuge includes a centrifuge rotor that rotates to provide supergravity conditions and tilt rotors that provide for sample agitation under the supergravity conditions. The centrifuge rotor is integral with a hollow centrifuge drive shaft. A tilt-drive shaft extends through the hollow and rotates coaxially of the centrifuge rotor. The tilt-drive shaft has a pinion that engages the tilt rotors, which thus are made to rotate about tilt axes that are spaced from and parallel to the centrifuge axis. A centrifuge motor is mechanically coupled to the centrifuge drive shaft to rotate the centrifuge rotor. A tilt motor is mechanically coupled to the tilt drive shaft for imparting a rocking motion of the tilt rotors (and thus of mounted sample reaction cells) relative to the centrifuge rotor. Both motors are controlled by a servo that receives orientation information from orientation encoders associated with the motors; the tilt motor is phase locked to the centrifuge motor to ensure precise relative motion control. The centrifuge motor is typically rotated to achieve a centrifugal force at the tilt rotors of about 1000 G. The tilt motor is controlled differentially relative to the centrifuge motor so that the tilt rotors rotate controllably, at, above and/or below the centrifuge rotation rate to achieve the desired rotation relative to the centrifuge. This centrifuge provides a robust and precise method of controlling fluid motion within a sample container.

7 Claims, 3 Drawing Sheets

COAXIAL-DRIVE CENTRIFUGE PROVIDING TILT CONTROL RELATIVE TO CENTRIFUGAL FORCE

This is a continuation-in-part application of U.S. patent application Ser. No. 09/514,975, filed Feb. 29, 2000.

BACKGROUND OF THE INVENTION

The present invention relates generally to chemical instrumentation and, more particularly, to centrifuges. A major objective of the present invention is to provide an improved centrifuge with tilt (i.e., rotation relative to gravitational or centrifugal force) control relative to the centrifugal force generated by the centrifuge.

The standard of living in modern societies has been greatly enhanced by advances in chemical, biological, and medical sciences. These fields all involve the separation of samples into constituent components that may then be processed to aid in their identification and/or quantification. The centrifuge is an important instance of instrumentation used to separate s ample components .

In addition, as described below, centrifuges that can control the tilt of a sample container relative to the centrifugal force can be used for pouring, mixing, filtering, and facilitating chemical reactions. Furthermore, tilting can be used to control liquid movement among multiple processing chambers of a sample container so that a series of processes can be implemented without manual intervention. Thus, a centrifuge with tilt control can automate sample processing conventionally performed manually by chemists.

A simple centrifuge has a centrifuge rotor that is spun, e.g., by a motor. Typically, a liquid-sample container spins with the rotor. The spinning sample components are subjected to a centrifugal force ($F=m\omega^2 r$) proportional to their mass, their distance from the centrifuge spin axis, and the square of the spin rate. The effect of the centrifugal force is much like the effect of gravity-liquid components are separated according to their relative densities. However, unlike gravity, the centrifugal force is readily controlled, e.g., by controlling the spin rate. Thus, a centrifuge can generate centrifugal forces orders of magnitude greater than gravity at the earth's surface. Generally, the "supergravity" conditions of a centrifuge are much more effective than gravity in separating sample components.

As suggested above, the supergravity conditions offered by centrifuges have uses other than component separation. Often the quantities of a sample available for analysis or processing are quite small. In the context of small sample volumes and the corresponding small capacities of the carrying the samples, surface tension limits liquid movement. The surface tension can make it difficult to flow a liquid from point to point as required for a series of processing steps or to mix a liquid as may be required to promote a reaction. The following three references disclose various approaches to tilting a sample container on a centrifuge relative to the centrifugal force. In each case, the tilting is used to control the movement of sample from chamber to chamber in a multi-chamber sample container to facilitate a series of reactions.

U.S. Pat. No. 5,089,417 to Wogoman discloses a centrifuge in which a holder for a sample container snaps from a first tilt orientation to a second tilt orientation when the centrifuge exceeds a predetermined rotation rate. Similarly, the first tilt orientation is resumed when the centrifuge spin rate falls below the threshold rate. Thus by increasing and decreasing the centrifuge spin rate, sample movement between reaction chambers of the sample container can be controlled. However, this approach provides little flexibility in selecting the centrifuge spin rate or tilt angles relative to the centrifugal force. It would be preferable to control the centrifuge rotation and the tilt actions independently.

Independent control of centrifuge spin rate and tilt action is disclosed in U.S. Pat. No. 4,814,282 to Holen et al. Similar to Wogomon, tilt of a sample container is used to transfer liquid from one chamber to another under the influence of centrifugal force. A tilt drive assembly, including motor and drive chain, is attached to the centrifuge rotor so that it rotates therewith. Power is delivered to the tilt-drive motor via slip rings, which tend to wear out as they are not generally designed to operate at centrifuge speeds. In this approach, any sensors used to track tilt would also rotate at high speeds, further complicating operation. In addition, centrifuge forces are applied to the tilt motor and drive train. For example, a 1-pound motor must withstand 1000-pound forces in a readily achievable 1000 G supergravity field. Thus, there are a number of robustness issues that can only be addressed with additional complexity and expense. U.S. Pat. No. 4,776,832 to Martin et al. avoids the need for physical connections to drive a tilt rotor by using inductive motors. The inductive motors include induction rotors that are physically coupled to holders, e.g., for reaction cells, and stationary stators, which are located beneath the centrifuge rotor (wheel). The stators induce eddy currents in the induction rotors, causing them to rotate. No physical connection is required between the stators and the induction rotors, eliminating the need to deliver power through slip rings. On the other hand, the non-physical coupling of drive and induction rotor does not ensure precise and flexible control of sample-container orientation relative to the supergravity field.

Related U.S. patent application Ser. No. 09/514,975, which is incorporated by reference herein in its entirety, teaches that agitating a sample container under centrifuge-induced supergravity conditions can overcome surface-tension to achieve rapid and thorough mixing. Such mixing can be invaluable in promoting many types of reactions, e.g., array hybridization.

Unfortunately, none of the three patents previously mentioned disclose centrifuges well adapted for this purpose. Wogomon lacks independent control over centrifuge spin rates and tilt angles. Holen does not provide sufficiently robust and precise control over tilt angle in view of the high speeds the tilt motor and any associated sensors must spin at. Martin lacks prescise control over tilt angle in view of the lack of a mechanical connnection between the tilt stators and the tilt rotors. What is needed is an economical and robust centrifuge that provides for independent and precise control of the tilt angle of a sample container relative to a spinning centrifuge rotor.

SUMMARY OF THE INVENTION

The present invention provides a coaxial-drive centrifuge with tilt control for manipulating liquid samples under supergravity conditions. The coaxial-drive arrangement allows a purely mechanical coupling between a stationary tilt motor to a tilt rotor that rotates relative to a rotating centrifuge rotor. The coaxial drive elements can be aligned with the axis of rotation for the centrifuge rotor. Appropriate gearing between the coaxial tilt-drive element, e.g., a shaft, and the tilt rotor allows the tilt axis to be displaced from the centrifuge axis. A sample container can be attached to the tilt rotor so that the angle of the container relative to the centrifugal force can be controlled to promote mixing or movement of the liquid contents of the container.

The invention provides for precise motion control. The centrifuge and tilt motors can be servo controlled. (Alternatively, high-speed stepper motors can be used.) The tilt motor is preferably phase-locked to the centrifuge motor. The desired positive and negative tilts relative to the centrifugal force can be added to the centrifuge servo angle to provide appropriate differential-drive commands to the tilt motor.

In a preferred realization of the invention, the tilt axis is parallel to and displaced from the centrifuge axis. Alternatively, the invention provides for any orientation of the tilt axis relative to the centrifuge axis, although, for most applications, the tilt axis is more parallel to the centrifuge axis than orthogonal to it.

In the case of parallel axes and a planar sample container, the plane of the container can be orthogonal to the tilt axis or generally orthogonal to the centrifugal force. The later orientation works best for agitating a sample by tilting back and forth so as to promote mixing. The former orientation works best for controlling the flow of a sample through a maze of chambers in the sample container. While sample motion control is provided in the prior art, the present invention allows much greater flexibility in the design of the maze since tilt angle is precisely controllable. In either case, the desired motion is achieved using a simple and robust mechanical linkage for both centrifuge and agitation motions. These and other features and advantages of the invention are apparent from the description below with reference to the following drawings.

BRIEF DESCRIPTION OF THE DRAWINGS

In FIG. 1, course diagonal hatching indicates a centrifuge housing, negative-sloping fine hatching indicates components associated with the centrifuge rotor, while positive-sloping fine hatching indicates components associated with the agitation rotors.

DESCRIPTION OF THE PREFERRED EMBODIMENTS

Figure 1:
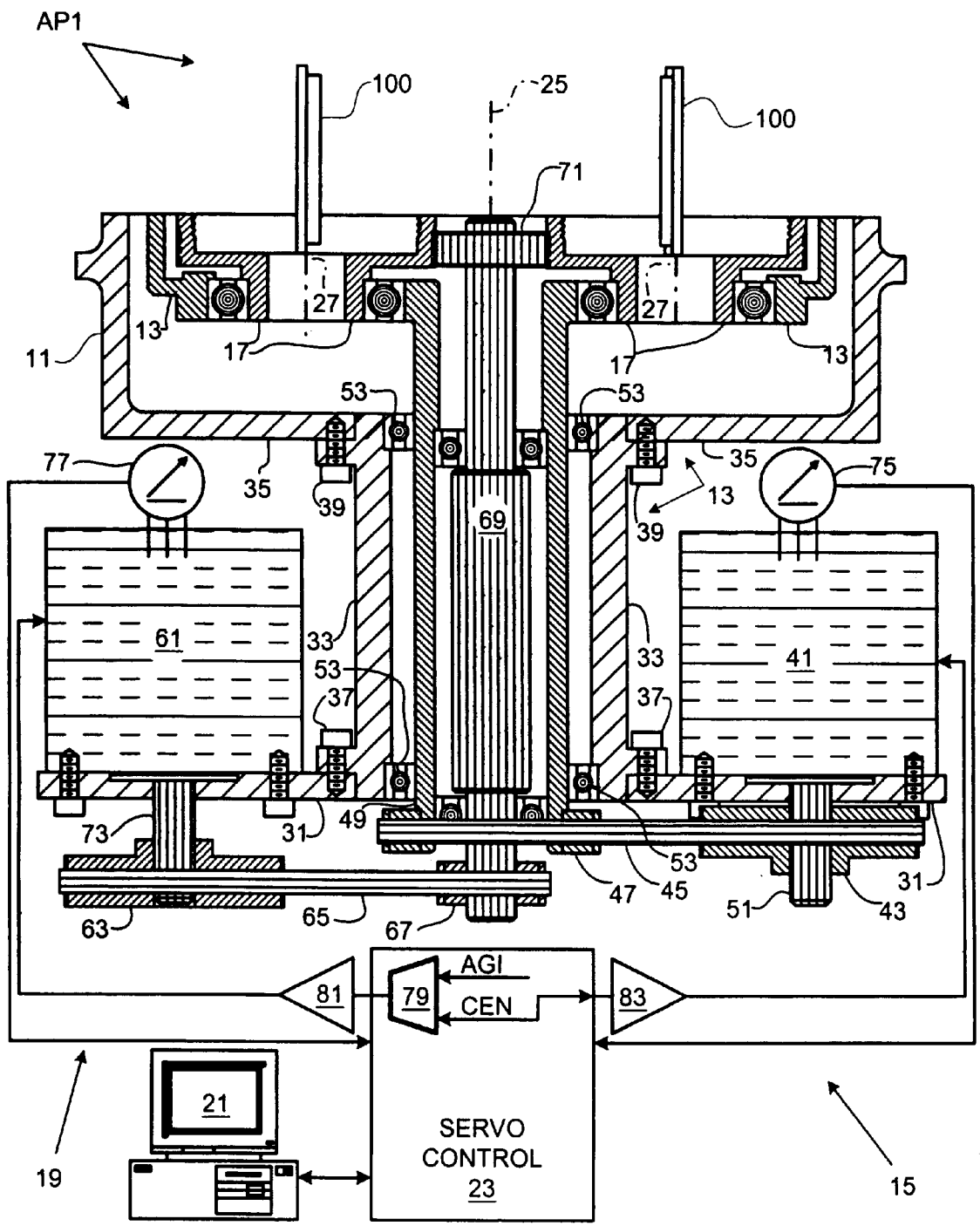
FIG. 1 is a schematic sectional view of an array hybridization system in accordance with the present invention.

In accordance with the present invention, a centrifuge AP1 for array hybridization of a liquid sample in reactions cells 100 is shown in FIG. 1. Centrifuge AP1 includes a housing 11, a centrifuge rotor 13, a centrifuge drive system 15, agitation rotors 17, a tilt drive system 19, a computer 21, and a servo controller 23. Tilt rotors 17 are rotatably mounted in centrifuge rotor 13 via ball bearings 25. Thus, while centrifuge rotor 13 rotates about its "centrifuge" axis 25, tilt rotors 17 rotate about their respective "tilt" axes 27, which are parallel to and displaced from centrifuge axis 25.

Housing 11 includes a washer-shaped base 31, a cylindrical sidewall 33, and a rotor shield 35. These housing components are indicated by course diagonal hatching in FIG. 1. Screws 37 attach sidewall 33 to base 31, while screws 39 attach shield 35 to sidewall 33.

Centrifuge drive system 15 includes a centrifuge motor 41, a centrifuge-motor pulley 43, a geared centrifuge-drive belt 45, a centrifuge-shaft pulley 47, and a hollow centrifuge shaft 49, the latter being integral with centrifuge rotor 13. Centrifuge-motor pulley 43 is rigidly coupled to a centrifuge-motor shaft 51 of centrifuge motor 41, while centrifuge-shaft pulley 47 is rigidly coupled to centrifuge shaft 49. Note that centrifuge shaft 49 is rotatably coupled to housing 11 via ball bearings 53.

Centrifuge-drive belt 45 couples pulleys 43 and 47 so that motor 41 can drive centrifuge shaft 49, and thus, centrifuge rotor 13. Pulleys 43 and 47 and belt 45 all have gear teeth to ensure a known relationship between motor orientation and rotor orientation. Pulleys 43 and 47 both have 100 teeth so centrifuge rotor 13 rotates on a 1:1 basis with motor shaft 41.

Tilt-drive system 19 includes a tilt-drive motor 61, a tilt-motor pulley 63, a tilt-drive belt 65, a tilt-drive-shaft pulley 67, a tilt-drive haft 69, and a tilt-drive pinion 71. Pinion 71 is monolithic with tilt-drive shaft 69. Tilt-drive shaft 69 extends along centrifuge axis 25 hrough a hollow in centrifuge drive shaft 49.

Tilt-motor pulley 64 is rigidly mounted on a tilt-motor shaft 73 of tilt motor 61. Geared tilt-drive belt 65 provides a drive link between pulleys 63 and 67, which both have gears. The gear ratio of pulley 63 to pulley 67 is 2:1. Tilt-drive shaft pulley 67 is rigidly coupled to tilt-drive shaft 69 so the rotation rate of pinion 71 is the rotation rate of tilt-drive shaft pulley 67. Pinion 71 drives tilt rotor 17 at 1:2 so that tilt motor 61 drives tilt rotor 1:1. Alternatively other gear ratios can be used, for example a higher motor-to-rotor gear ratio can be used to achieve higher torque for faster acceleration when changing tilt directions.

Centrifuge motor 41 and tilt motor 61 are controlled by servo controller 23. To this end, each motor 41, 61, includes a respective orientation encoder 75, 77. Each motor has 1000 marks indicating 1000 evenly spaced orientations. Each encoder detects these marks optically and provides information necessary for servo controller to track the orientations of each motor 41, 61, and thus of respective rotors 13,17.

Servo controller 23, manufactured by Galil Corporation in Mountain View, California, typically commands centrifuge motor 41 to rotate at a constant speed in a single direction. For example, a rotation rate of 3000 rpm can be used to achieve 1004 G supergravity given a 10 centimeter spacing (using the formula $F=m\omega^2 R$) between centrifuge axis 25 and tilt axis 27. To ensure the rotation rate is maintained, servo controller 23 compares actual orientation with expected orientation over time. Deviations are compensated for as in conventional servo operation.

Note that, if the tilt rotor rotation rate matches the centrifuge rotation rate, the orientation of a reaction cell 100 relative to the centrifuge rotor (and thus the direction of supergravity) does not change. If a stirring motion is required, the desired stirring rate can be added or subtracted from the centrifuge rotation rate to obtain the desired tilt rotation rate. This operation is indicated by the tilt TLT and centrifuge CNT signals being summed by a summing amplifier 79. Such a stirring motion can be used with reaction cells lying flat on the tilt rotor (perpendicular to tilt axes 27). The drive signals from servo control 23 are amplified by Copley amplifiers 81 and 83.

In general, for reaction cells oriented along tilt axes 27, as shown in FIG. 1 with reaction cells 100, a rocking motion is desired for agitation. In this case, a preferred motion would be to rotate to a desired tilt relative to the centrifuge radius (down in the direction of supergravity), optionally hold that orientation for a time, then rotate in the opposite direction to the opposite tilt, optionally hold that orientation for a time, and iterate.

To achieve the desired rocking motion, computer 21 determines the desired plus and minus differential orientations for tilt motor 61 relative to the orientation of centrifuge motor. These serve as stops between tilts. Computer 21 then programs servo controller 23 accordingly. To tilt in one direction, tilt rotors 17 must rotate (relative to the inertial frame) faster than centrifugal motor 13. To tilt in the opposite direction, tilt rotors must rotate slower than centrifugal motor 13.

Figure 2:
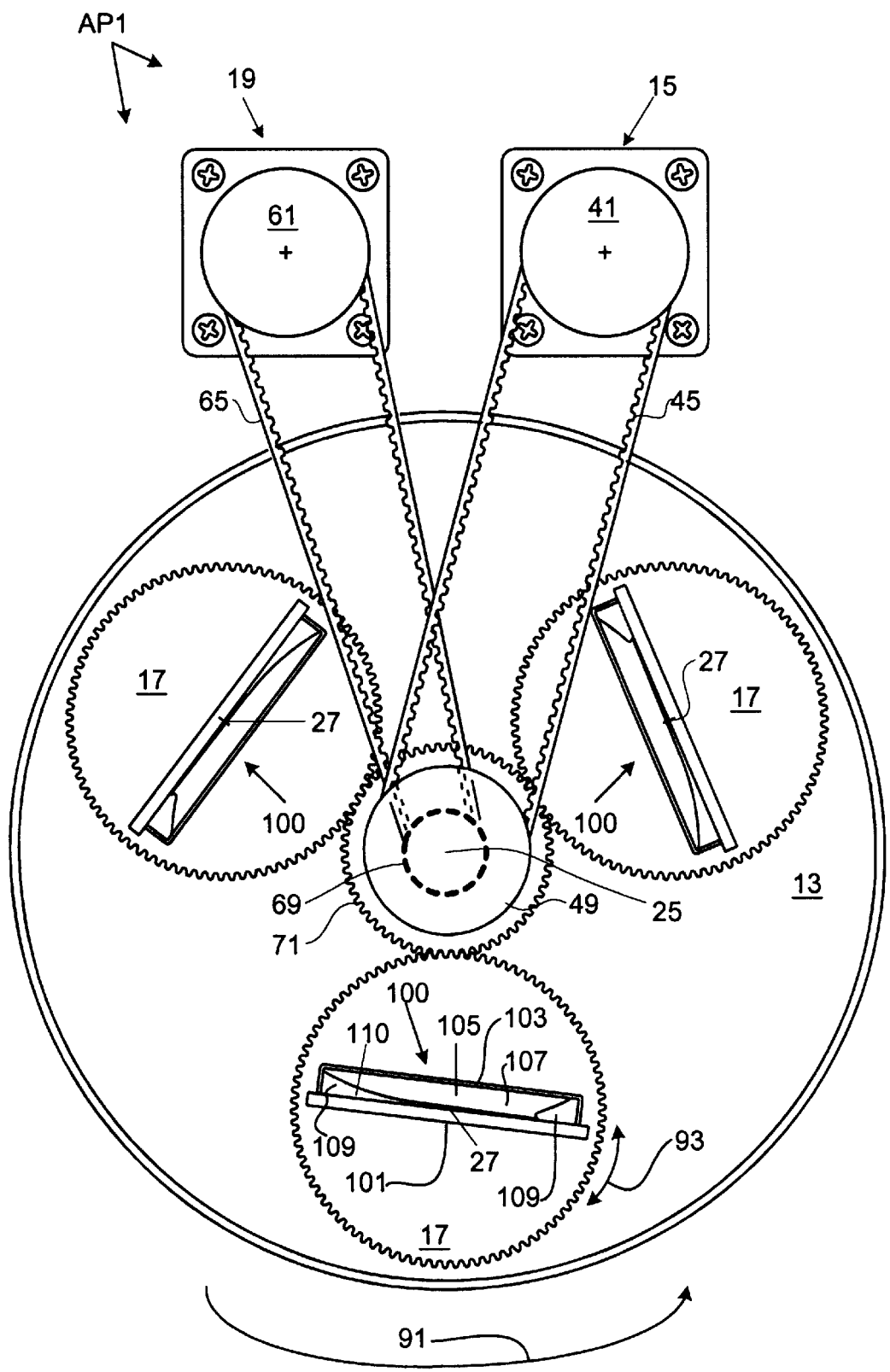
FIG. 2 is a schematic plan view of the array hybridization system of FIG. 1 with reaction cells.

For example, centrifuge motor 41 and thus centrifuge rotor can rotate at 3000 rpm. The desired centrifuge rotor rotation motion and tilt rotor rocking motions are indicated by arrows 91 and 93, respectively, in FIG. 2. The agitation amplitude is selected to be about ±6° to effect full "sloshing" of the sample liquid. The agitation rate depends on the sample liquid and the centrifugal force. A typical value would be a 5 Hz agitation, which would yield ten replenishments per second. These values are programmed into servo 23 by computer 21 using a high-level programming language used by Galil servo-controller 23.

Encoders 75 and 77 are 250 slot A quad B encoders that resolve 360° into 1000 orientations. Thus, sixteen encoder counts roughly corresponds to 6°. Thus, a command sequence to servo controller 23 can take the form of the following commands processed at the rate of ten per second: "advance the tilt motor sixteen counts relative to the centrifuge motor, reverse for thirty-two counts, forward again for thirty-two counts, reverse again for thirty-two counts, and so on, ending with a sixteen-count return to center.

Other embodiments employ other gear ratios. In such cases, the tilt motor rate is still determined from the sum of the centrifuge rotor spin rate and the desired tilt rate. In this case, however, the sum is multiplied by the tilt motor:rotor gear ratio. Also, the centrifuge rotor spin rate is the quotient of the centrifuge motor spin rate divided by the centrifuge motor:rotor gear ratio. These relationships determine how a servo is to control the tilt motor and centrifuge motors. These relationships assume that the tilt and centrifuge motors and encoders are equivalent. If they differ, the drive commands will have to take these differences into account as is known in the art.

Reactions cells 100 are similar so the following description of any one is representative. A reaction cell 100 includes a substrate 101 and a cover 103 so as to define a 2 cm×2 cm×0.25 mm interior volume or "reaction chamber" 105. (In the figures, the thickness of reaction cell 100 is exaggerated for clarity.) During hybridization, this interior volume is partially filed with sample liquid 109, with the remainder of the cell interior volume being filled with gas 107, e.g., dry air or nitrogen. A hybridization array 110 with 10,000 probes arranged in a 100×100 array is defined on substrate 101 on the side contacted by sample liquid. Two septa (not shown) in each cover 103 permit fluid to be introduced and removed from reaction cell 100.

Figure 3A:
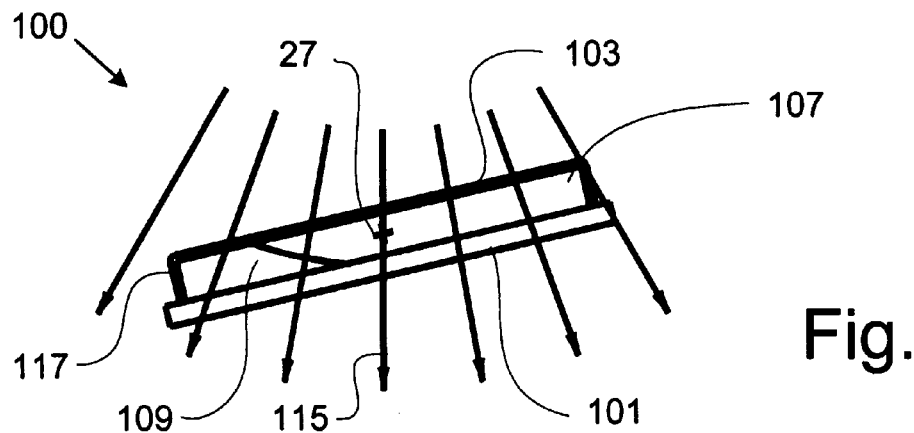
FIGS. 3A–3C show three orientations of a reaction cell of FIG. 2 being agitated in accordance with the present invention by the system of FIGS. 1 and 2.

In FIG. 3A, reaction cell 100 is shown titled counter-clockwise +6° relative to a central centrifugal force vector 115 at the beginning of an agitation cycle. (Agitation angles are exaggerated in FIGS. 3A–3C for clarity.) In this orientation, all sample liquid 109, other than a thin film, is at the end 117 shown to the left in FIGS. 3A–3C. The surface of sample liquid 109 in the static state represents a constant radius from centrifugal axis 113 (FIG. 1).

Figure 3B:
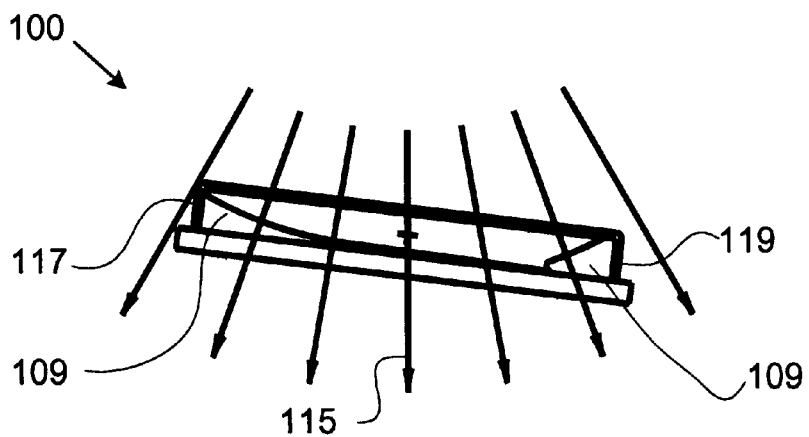

In FIG. 3B, reaction cell 100 has rotated clockwise past a level (orthogonal to a centrifugal force vector 115) orientation to a −2° clockwise orientation. In this orientation, some of the liquid has reached the opposite end 119 (to the right in FIGS. 2A–2C). Most of the remaining liquid is still at the clockwise end 117, while a tapered sheet of sample liquid 109 extends between the ends 117 and 119.

Figure 3C:
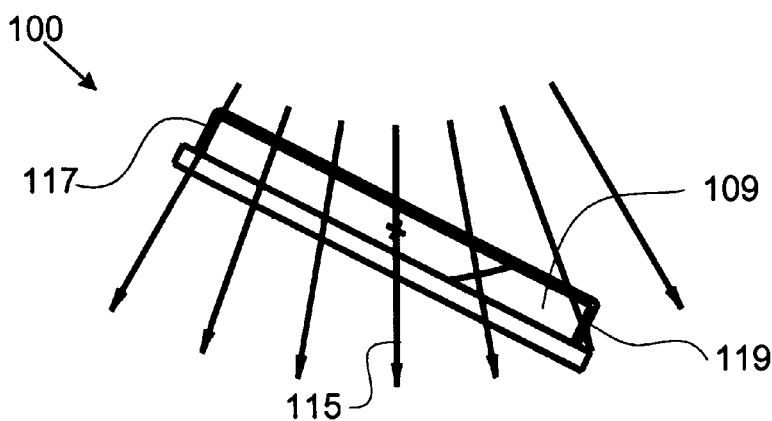

In FIG. 3C, reaction cell 100 has rotated to an extreme clockwise position at −6°. In this position, except for a thin film, sample liquid 109 is at the right end 119 of reaction cell 100. This completes the first half of an agitation cycle. The second half of the agitation cycle begins with the orientation of FIG. 3C and ends with the orientation of FIG. 3A. The return motion provides for highly desirably vertical mixing.

The vertical mixing assures that every target molecule spends some time close enough to array 110 for binding to occur. The centrifugal force 115 helps overcome the inertia of the liquid and its non-specific binding forces with the substrate so that a high agitation rate can be maintained. The advantages of the invention can be understood with the following, admittedly approximate, understanding of the hybridization process.

When the agitation rate is doubled, each target molecule is likely to be found half as far from a respective probe for half the time. When it is half as far, it is four times as likely to hybridize. However, the interval over which it can hybridize is half as long. Thus, in principle, doubling the agitation rate doubles the hybridization rate. This linear relationship applies until non-specific binding fluid forces prevent sample liquid from completing its motion across the array. The stronger the centrifugal force, the higher the agitation rate can be raised before this limiting consideration applies. Thus, the centrifuge rate can be increased until the forces involved adversely affect specific binding or threaten the integrity of the hybridized or non-hybridized species.

In FIG. 1, tilt axes 27 are parallel to the centrifuge axis 25 and the hybridization arrays are generally orthogonal to the centrifugal force. In other embodiments, the sample containers are also generally orthogonal to the centrifugal force, but the tilt axes are not parallel to the centrifuge axis. For example, the tilt axes can be circumferentially (in other words, "tangentially") oriented relative to the centrifuge axis.

Reaction cells 100 of FIG. 1 are oriented so that arrays 110 generally orthogonal to the centrifugal force. Oblique orientations are also provided for. For example, reactions cells can be oriented so that they are more orthogonal to the centrifugal force than along it. However, reaction cells can be oriented both along and orthogonal to the centrifugal force.

Particularly with a circumferentially oriented tilt axis, but also in other cases in which the array is orthogonal to the centrifugal force, the substrate can be curved cylindrically, for example, along a radius slightly less than (e.g., 90% of) the distance between the tilt axis and the centrifuge axis. In this case, the centrifugal force is more orthogonal to the array away from the array center and even at the extremes of the tilt motion. This provides a more uniform sample liquid distribution across the array, which in turn allows less sample liquid to be used without risking drying of the array. In addition, the agitation is gentler on the sample.

The reaction cell can also include fastening means effective to press the cover and the substrate together, i.e., to immobilize the cover on the substrate, thereby forming a watertight, temporary seal therebetween. The fastening means ensures stable, effective and secure positioning of the cover over the substrate. Optional gasket means adjacent the surface of the cover may be included to aid in equalizing the pressure provided by the fastening means. The optional gasket may be, for example, placed between the cover and the rigid frame to provide compliance in the system and to even the pressure applied to the cover and the substrate. The apparatus further comprises fluid transfer means that enables introduction of fluid from the exterior of the apparatus to the reaction chamber, and removal therefrom. In a preferred embodiment, the fluid introduction means comprises one or more ports in the cover.

It is preferred that the cover be made of plastic and the substrate of glass, plastic, fused silica or silicon, the seal between plastic and either glass, plastic, fused silica or silicon being advantageous for producing the apparatus of the invention. The cover material should be thermally stable, chemically inert, and preferably non-stick. Furthermore, when the apparatus is used in hybridization, the cover should be comprised of a material that is chemically and physically stable under conditions employed in hybridization. In a preferred embodiment, the plastic cover is polypropylene, polyethylene or acrylonitrile-butadiene-styrene ("ABS"). In the most preferred embodiment, the plastic cover is comprised of polypropylene. The cover may be constructed by machining or molding technologies.

As noted above, the cover preferably has a lip along its cover bordering a large central recessed portion of the inner face of the cover. Applying pressure to the outer face of the cover directly above the perimeter lip is required to form the tight seal between the cover and the substrate. Any means that presses the lip of the cover securely to the substrate is suitable. Such pressure may be applied evenly by, for example, clamps, a press, or by coverturing the substrate and cover within a two-part rigid frame and compressing the two together to supply an even pressure to the cover and substrate. If desired, the peripheral lip of the cover may be modified to provide for an improved seal; for example, one or more continuous ridges can be incorporated into the lip so that the pressure supplied to the cover is higher at those locations and preferentially causes them to compress.

In any of these embodiments, the reaction cell may be re-used, as the peripheral seal is temporary and the fastening means may be removed when desired. Thus, the reaction cell may be readily disassembled after use, cleaned, and re-assembled (with alternate components, such as a different substrate, if desired) so that some or all of the components of the reaction cell may be re-used.

This reaction cell interior height may range from about 0.002" to 0.02" (50 $\mu$m to 500 $\mu$m). The dimension of the cover, the peripheral lip, and the reaction area are such that the reaction area is generally in the range of about 4 mm$^2$ to 500 mm$^2$, preferably about 20 mm$^2$ to 350 mm$^2$, and the reaction chamber has a volume in the range of about 0.2 $\mu$l to about 312 $\mu$l, preferably about 1 $\mu$l to 200 $\mu$l.

Hybridization array 110 has a plurality of molecular probes bound thereto. Preferably, the molecular probes are arranged in a spatially defined and physically addressable manner, i.e., are present in one or more "arrays." In a most preferred embodiment, the probes are oligonucleotide probes (including cDNA molecules or PCR products), although other biomolecules, e.g., oligopeptides and the like, may serve as probes as well.

The present invention has applicability to analytical chemistry and industry fields that rely on its techniques. While centrifuge AP1 is described in its use for hybridization and other reaction requiring liquid agitation, it can also be used for sequencing reactions by moving a liquid from chamber to chamber in a sample container. In addition, it can be used for sample-component separation.

Variations on the disclosed embodiments provide for other orientations of the sample container relative to the centrifuge and/or tilt axis. Alternative embodiments provide for non-parallel relationships between the centrifuge and tilt axes and even for varying the angle between these axes. Where precision is not critical, nonservo motors can be used in applications. On the other hand, fast stepper motors can be used as an alternative to servo-controlled motors where precision is required. These and other variations upon and modifications to the disclosed embodiments are provided for by the present invention, the scope of which is defined by the following claims.

What is claimed is:

1. A centrifuge for tilting a sample container under supergravity conditions, said centrifuge comprising:

a centrifuge rotor, said centrifuge rotor being rotatable about a centrifuge axis;

a tilt rotor, said tilt rotor being rotatably coupled to said centrifuge rotor so as to be rotatable about a tilt axis not coincident with said centrifuge axis;

centrifuge drive means for rotating said centrifuge rotor; and tilt-drive means including a tilt motor for rotating said tilt rotor, said tilt-drive means including a tilt-drive shaft extending along said centrifuge axis and being rotatable about said centrifuge axis; and servo-control means for controlling the orientation of said tilt rotor by controlling said tilt motor in part as a function of the orientation of said centrifuge rotor.

2. A centrifuge as recited in claim 1 wherein said centrifuge drive means includes a centrifuge motor that controls the orientation of said centrifuge rotor, said tilt-drive means controlling the orientation of said tilt rotor via said tilt-drive shaft.

3. A centrifuge as recited in claim 2 wherein said centrifuge motor and said tilt motor are stationary.

4. A centrifuge as recited in claim 1 further comprising centrifuge orientation encoder means for providing indications of the orientation of said centrifuge rotor, said centrifuge orientation encoder means being coupled to said servo-control means for providing said indications thereto.

5. A centrifuge as recited in claim 1 further comprising encoder means for indicating the orientations of said tilt rotor and said centrifuge rotor to said servo-control means.

6. A centrifuge as recited in claim 1 wherein said tilt rotor includes means for coupling said sample container rigidly thereto.

7. A centrifuge as recited in claim 1 wherein said tilt axis is more parallel to said centrifuge axis than orthogonal to it.

* * * * *